Nov. 14, 1972   N. V. FOWLER, JR., ET AL   3,702,644
BLOW DOWN QUIETER
Filed Sept. 10, 1971   2 Sheets-Sheet 1

Nov. 14, 1972  N. V. FOWLER, JR., ET AL  3,702,644
BLOW DOWN QUIETER
Filed Sept. 10, 1971  2 Sheets-Sheet 2

3,702,644
BLOW DOWN QUIETER

Neal V. Fowler, Jr., Arthur P. Gallagher, and Calvin L. Chance, Jr., Dallas, Tex., assignors to Vibration & Noise Engineering Corporation, Dallas, Tex.
Filed Sept. 10, 1971, Ser. No. 179,452
Int. Cl. F01n 1/10, 7/10
U.S. Cl. 181—50       10 Claims

ABSTRACT OF THE DISCLOSURE

A skid mounted open-topped tank having manifold interconnected multiple perforated diffuser tubes positioed in the lower portion thereof is arranged for connection to a pressurized gas discharge passageway by an adjustable conduit. The upper portion of the tank is provided with a plurality of planar sound absorption panels vertically positioned to form a plurality of parallel discharge ducts. The sound absorption panels include a core of sound absorption material retained between two perforated stiffened backing sheets.

BACKGROUND OF THE INVENTION (a) Field of the invention

Apparatus for attenuating the noise generated by the discharge of a pressurized gas through a passageway to atmosphere.

(b) Description of the prior art

When it is necessary to service a valve or a portion of a gas transmission pipeline it is first necessary to isolate that portion of the pipeline and to vent or blow down the pressure therein to atmosphere. Since these pipelines are frequently operated at 500 to 1000 pounds of pressure per square inch, the venting of this pressure throguh a valve to atmosphere can create a tremendous noise. For example, tests have shown that the unrestricted venting through a two inch valve of a pipeline section charged to 430 pounds per square inch will give a sound pressure level 5 feet from the valve of 137 decibels. This noise level is unacceptable in populated areas and is frequently unacceptable in rather remote areas.

Two methods are available in the prior art for overcoming this noise problem. First, the venting may be done very slowly by barely opening a venting valve and letting the line bleed off over a long period of time. This reduces the noise level caused by the venting since the volume of flow across the pressure differential is reduced. However, this method is not acceptable since it is excessively time consuming and therefore uneconomical. This slow venting could take 24 hours or longer to vent a ten mile long section of 20 inch gas pipeline.

One solution recently proposed is the use of a quieting or muffling device on the venting valve to reduce the output sound level when the valve is fully opened and venting. Typical art illustrative of this type of apparatus is Everett U.S. Pats. 2,998,860 and 3,454,129, wherein the gas stream from the valve is directed through a single perforated diffuser into a cylindrical pressure vessel plenum. The plenum is then vented to atmosphere through one or more perforated tubes surrounded by sound absorbent material.

While this type of prior art apparatus does provide some outlet noise level reduction, it has several disadvantages. First, the use of perforated tube vent pipes, even in substantial numbers, presents a relatively small sound absorption surface area to the gas stream. The use of such tubes has heretofore been considered desirable, however, since tubular vents are most effective for attenuating low frequency sounds. And, as described below, it has been accepted theory that high velocity gas discharges, particularly from larger diameter openings, create a predominantly low frequency noise.

Secondly, the use of a single perforated diffuser tube to distribute the gas into a plenum tank is inherently inefficient for sound reduction. The prior art teaches that the primary use of a perforated diffuser is to elevate the frequency of the lower frequency noise components to allow more efficient absorption of these components in the vent tube assembly.

The heretofore accepted high velocity gas formula states:

$$f = \frac{S \times V}{d}$$

Where $f$ is the frequency, $V$ is velocity of the gas, $d$ is the opening diameter, and $S$ is Strouhal Number (which for pressure ratios of 3:1 or greater may be taken as 0.08). Using this formula, the center frequency of an unrestricted high velocity gas stream flowing through a ten inch opening would appear to be approximately 250 Hz. Following this criteria, prior art apparatus utilizes a single diffuser having relatively small perforations therein so that the gas velocity is increased and the opening diameter decreased, in order to raise the predominant or center frequency of the noise. In utilizing a diffuser designed to achieve this particular frequency increase purpose, the prior art designs inherently result in a non-uniform flow of gas within the plenum and vent section. These locally high gas velocities result in a regeneration of objectionable noise within the apparatus itself.

SUMMARY OF THE INVENTION

During field evaluation studies preparatory to designing the instant invention, recordings were taken adjacent high velocity gas streams exiting from two inch, six inch, eight inch and ten inch openings. Contrary to accepted theory, as above discussed, these evaluation studies indicated that the center frequency of the discharge gas noise from each of the above openings was fairly constant at approximately 2000 Hz. As a result, it was determined that the use of a single diffuser for frequency elevation of expected low frequency noise components should be relegated to secondary consideration. More importantly, the use of multiple diffusers to achieve an even gas distribution and the subsequent attenuation of the higher frequency components should be given primary consideration.

Accordingly, it is an object of this invention to overcome many problems of the prior art by providing a blow down quieting apparatus particularly suited to attenuate the actual, rather than the theoretical, noise conditions. The invention includes an open-topped tank having manifold interconnected multiple perforated diffuser tubes positioned in the lower portion thereof and arranged for connection to a pressurized gas discharge passageway. The upper portion of the tank is provided with a plurality of planar sound absorption panels vertically positioned to form a plurality of parallel discharge ducts. The sound absorption panels include a core of sound absorption material retained between two perforated stiffened backing sheets.

DESCRIPTION OF THE PREFERRED EMBODIMENT

Figure 1:
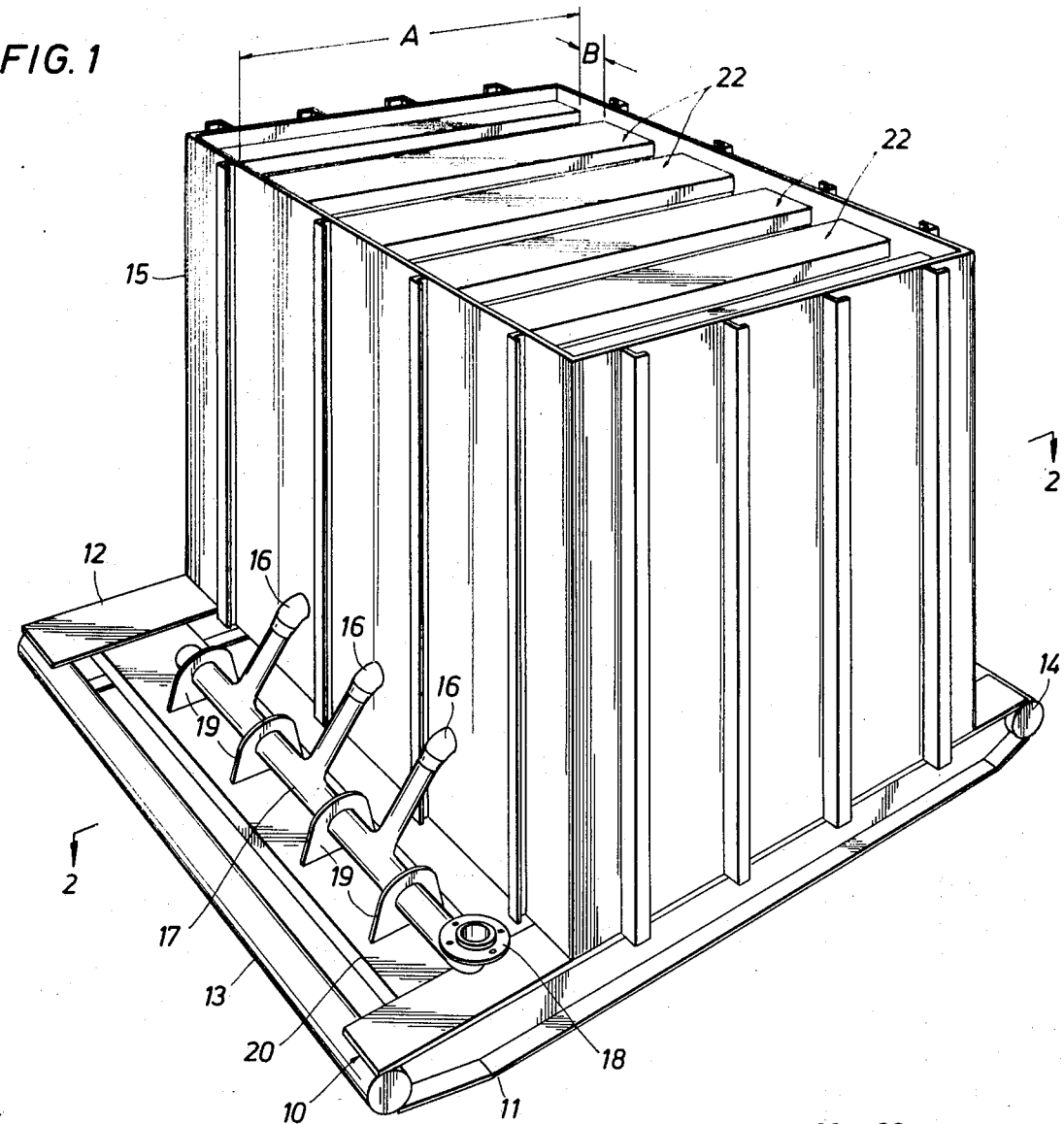
FIG. 1 is a perspective view of the apparatus of this invention.

Referring to the drawings, and particularly to FIG. 1, one embodiment of this apparatus includes a skid type base, generally designated 10, formed of parallel beams 11 and 12 interconnected by cross braces 13 and 14. Mounted on base 10 is a generally rectangular open-top tank 15.

As shown in the figures, three parallel diffuser tubes 16 extend generally horizontally across tank 15 in the lower portion thereof and are externally interconnected by manifold 17 having an inlet flange 18 thereon. Manifold 17 is conveniently supported by braces 19 which are connected to plate 20 attached to base 10.

The primary function of diffuser tubes 16 is to evenly distribute a pressurized gas from manifold 17 within the lower or plenum chamber portion of tank 15. Accordingly, tubes 16 are axially spaced apart and the portions of each located within tank 15 are each provided with a plurality of perforations 21. The total area of perforations 21 for each of tubes 16 preferably should be at least equal to the cross-sectional area of each of tubes 16 so that the gas dispersal may be achieved while creating a minimum back pressure upon the gas stream and so that local pockets of noise producing high velocity gas may be kept at a minium. In some configurations perforations 21 may theoretically serve a secondary and less important function of tending to increase the frequency of some components of gas stream noise. However, as noted above, this frequency change function of tubes 16 is less important than the gas dispersal function.

The upper portion of tank 15 is provided with a plurality of generally planar sound absorption panels 22 which are arranged in a vertical parallel relationship to form a plurality of parallel discharge ducts 23. It has been determined that this type of generally rectangular cross-section discharge duct presents a greater sound absorption surface to the gas stream than does the prior art tubular discharge vents and also is more efficient than tubular vents for attenuating the principal noise frequencies, as described above. Tests to date indicate that best acoustic attenuation occurs using a duct length A to width B ratio, as shown in FIG. 1, of approximately 12:1. Since these tests have shown a greatly increased acoustic performance by doubling the length to width ratio while maintaining a constant flow area, even larger length to width ratios may bive even better performance.

Figure 2:
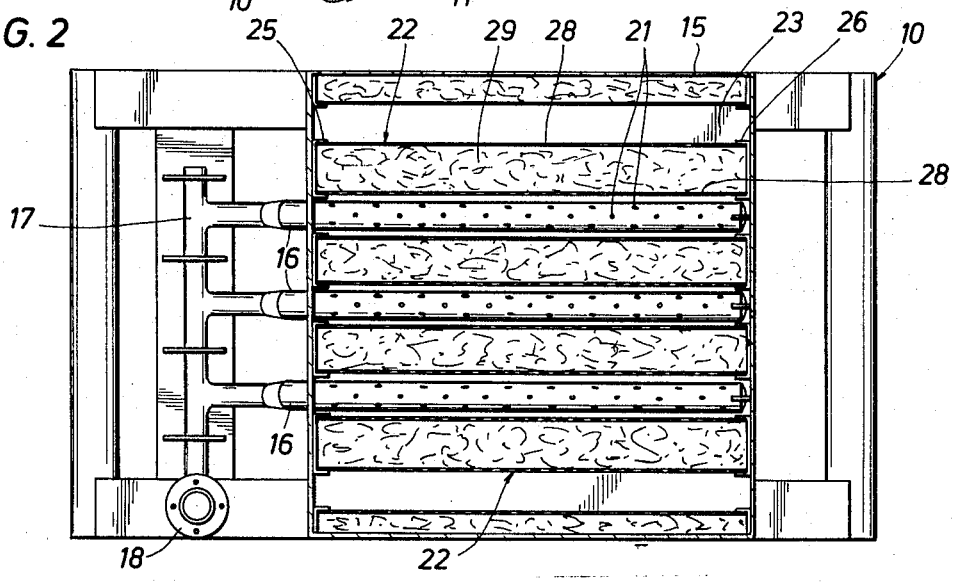
FIG. 2 is a partial cross-sectional view taken along 2—2 of FIG. 1.
Figure 3:
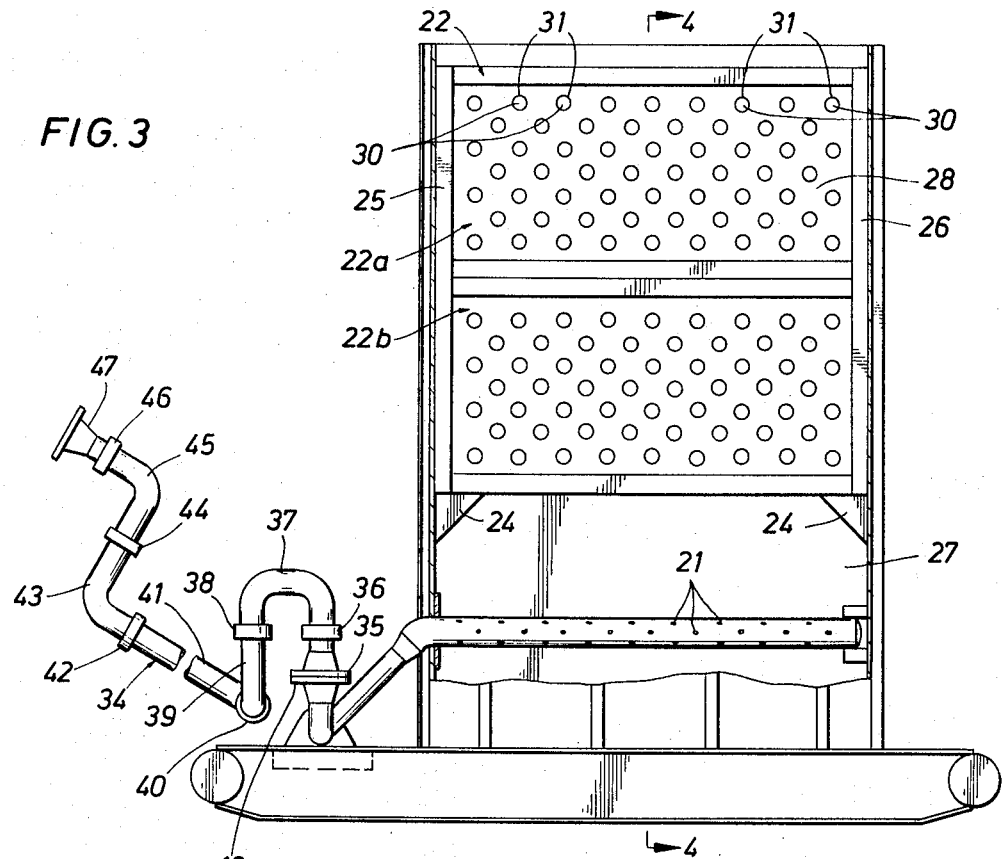
FIG. 3 is a side elevation view, partly in section.
Figure 4:
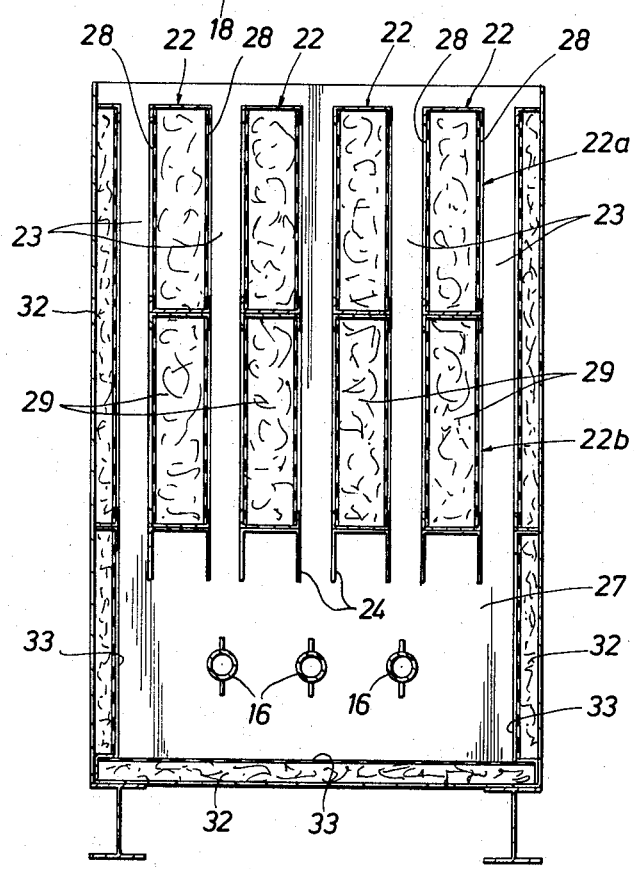
FIG. 4 is a vertical sectional view taken along 4—4 of FIG. 3.

Panels 22 are supported within tank 15 by angle brackets 24 and may be connected thereto by bolts or the like to permit easy removal and servicing of panels 22. In the alternative, instead of anchoring panels 22 to brackets 24, panels 22 may be arranged to rest upon brackets 24 and to be vertically aligned by opposing vertical channels 25 and 26 as shown in FIG. 2, which channels are suitably secured to opposing walls of tank 15. As shown in FIGS. 3 and 4, panels 22 may be formed in two or more separable sections, such as 22a and 22b, to facilitate construction and maintenance. The lower surfaces of panels 22 may be considered as defining a plenum chamber 27 within the lower portion of tank 15.

Each of panels 22 is formed of two parallel backing sheets 28, with a suitable sound absorbent material 29, such as fiber glass batting, therebetween. As shown in FIG. 3, backing sheets 28 are perforated by perforations 30 which permit the noise carried by the gas flowing through ducts 23 to enter and become attenuated by fiber glass 29. To date it has been determined that a backing sheet 28 having a total area of perforations 30 equal to about 23% of the total surface area of sheets 28 presents the most suitable perforation area consistent with proper retention of commercially available fiber glass batting between sheets 28.

It has further been determined that, while flat perforated sheets may be used for backing sheets 28, the relatively large surface area of each sheet of metal combined with the relatively large areas of perforation in each sheet tends to allow the individual sheets to flex or vibrate longitudinally in operation and that this movement can generate additional noise. Accordingly, although not shown in detail in the drawings, it has been found that it is preferable to stiffen sheets 28 by the use of upsets or dimples 31 formed in the surface thereof surrounding each of perforations 30. One type of material suitable for use as sheets 28 is commercially available under the name "perforated dimpled sheet."

Referring now to FIG. 4, portions of the interior walls of tank 15 are also lined with sound absorbent material in this embodiment. Viewing the apparatus from the manifold end, the left and right walls and the bottom of tank 15 are also covered with fiber glass sound absorbent material 32 which is held in position by similar perforated dimpled backing sheets 33. While venting ducts 23 have been described above as being formed by two adjacent parallel acoustic panels 22, it should be understood that the two outermost ducts each may be formed by one acoustic panel 22 in association with an adjacent wall of tank 15 lined with sound absorbent material, as shown in FIG. 4.

Referring to FIG. 3, the apparatus of this invention also includes conduit means, generally designated as 34, to allow connection of the apparatus to a passageway to be vented. This conduit means is made adjustable so that it can accommodate a plurality of vertical and horizontal alignments between flange 18 and the passageway to which it is to be connected. Conduit 34 includes a flange 35 arranged for mating connection to flange 18, and rotatable pipe joints 36, 38, 40, 42, 44 and 46 which interconnect pipe sections 37, 39, 41, 43 and 45. A flanged fitting 47, appropriately selected to mate to the flange of the passageway to be vented (not shown), connects to rotatable pipe joint 46 and terminates the conduit.

Further modifications and alternative embodiments of the invention will be apparent to those skilled in the art in view of this description. Accordingly, this description is to be construed as illustrative only and is for the purpose of teaching those skilled in the art the manner of carrying out the invention. It is to be understood that the form of the invention herewith shown and described is to be taken as the presently preferred embodiment. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. In apparatus for attenuating the noise generated by the discharge of a pressurized gas through a passageway to the atmosphere, the combination comprising:
    an open-topped tank;
    a plurality of perforated diffuser tubes positioned in the lower portion of said tank and arranged to distribute a pressurized gas therein;
    a manifold communicating with each of said tubes and arranged for connection to said passageway;
    and, a plurality of planar sound absorption panels vertically positioned in the upper portion of said tank forming a plurality of parallel discharge ducts.

2. The invention as claimed in claim 1 wherein:
    the total area of perforations in each of said diffuser tubes is at least equal to the cross-sectional area thereof.

3. The invention as claimed in claim 2 wherein:
    said diffuser tubes are generally parallel and axially spaced apart and extend generally horizontally across said tank.

4. The invention as claimed in claim 1 wherein each of said sound absorption panels includes:
two outer perforated backing sheets;
and, a core section between said backing sheet formed of sound absorption material.

5. The invention as claimed in claim 4 wherein:
sad backing sheets are formed with dimpled surfaces to add rigidity thereto.

6. The invention as claimed in claim 4 wherein:
the perforations in said backing sheets have a combined area equal to approximately 23% of the surface area of said sheets.

7. The invention as claimed in claim 4 wherein:
said discharge ducts have a generally rectangular horizontal cross-section with a length to width ratio of approximately 12:1.

8. The invention as claimed in claim 1 including:
conduit means for interconnecting said passageway and said manifold.

9. The invention as claimed in claim 8 wherein:
said conduit means includes a plurality of generally tubular pipe sections interconnected by rotatable pipe joints, whereby said conduit means may be adjusted for a plurality of manifold to passageway positions.

10. The invention as claimed in claim 8 including:
said tank and manifold being mounted upon a cross-braced parallel beam skid.

References Cited

UNITED STATES PATENTS

| | | | |
|---|---|---|---|
| 2,075,263 | 3/1937 | Bourne | 181—42 |
| 2,091,774 | 8/1937 | Weiland | 181—56 |
| 2,998,860 | 9/1961 | Everett | 181—56 |
| 3,219,143 | 11/1965 | Bohanon | 181—50 |
| 3,454,129 | 7/1969 | Everett | 181—56 |

FOREIGN PATENTS

| | | | |
|---|---|---|---|
| 290,694 | 5/1969 | Australia | 181—50 |
| 585,273 | 10/1959 | Canada | 181—60 |

ROBERT S. WARD, JR., Primary Examiner

U.S. Cl. X.R.

181—33 F, 56, 60